Nov. 18, 1930.  E. E. C. SERRE  1,782,321
REAPING MACHINE
Filed April 12, 1927  4 Sheets-Sheet 1

Inventor
Eugene Edmond Charles Serre
by Connolly Bros
Atty

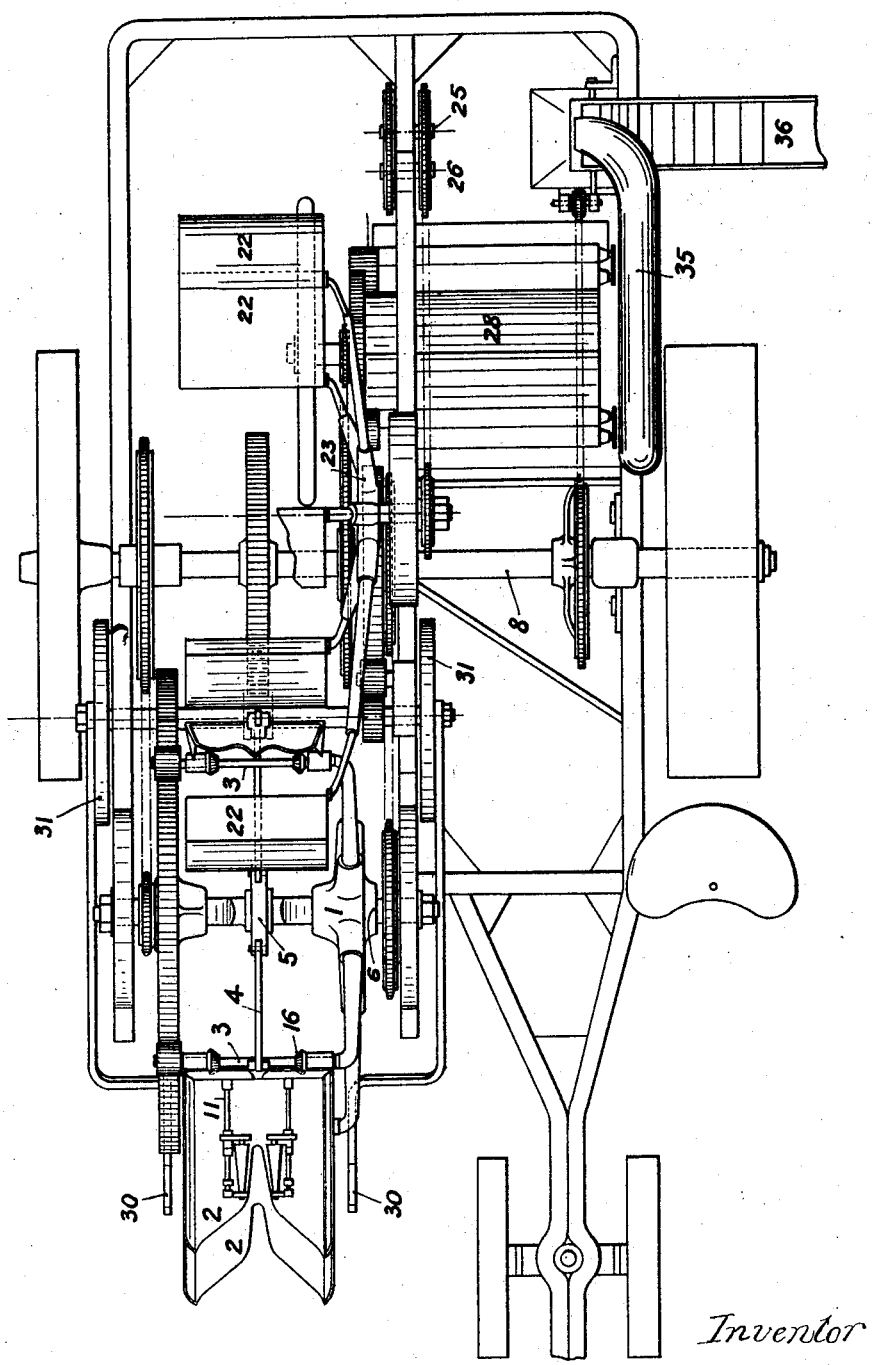

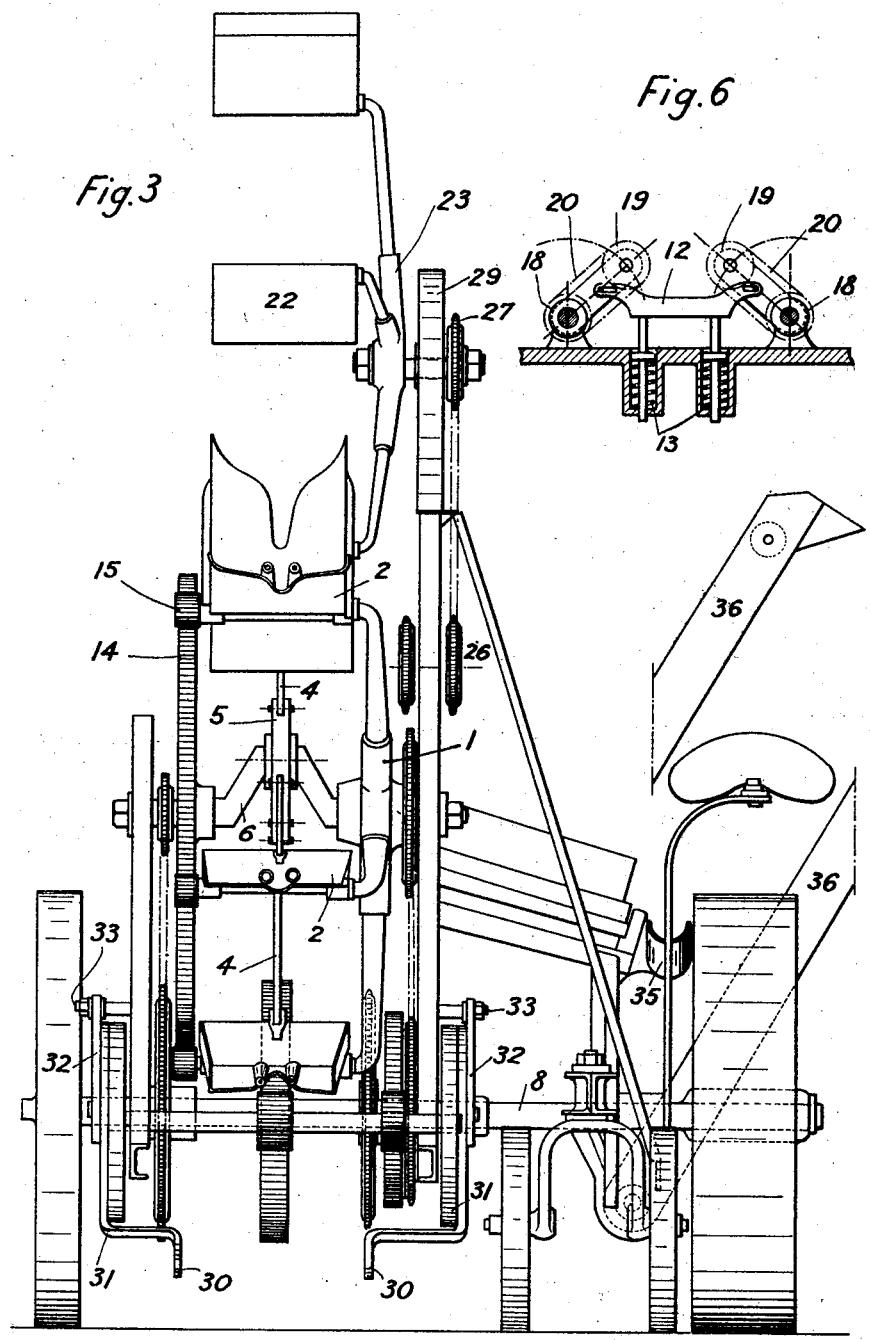

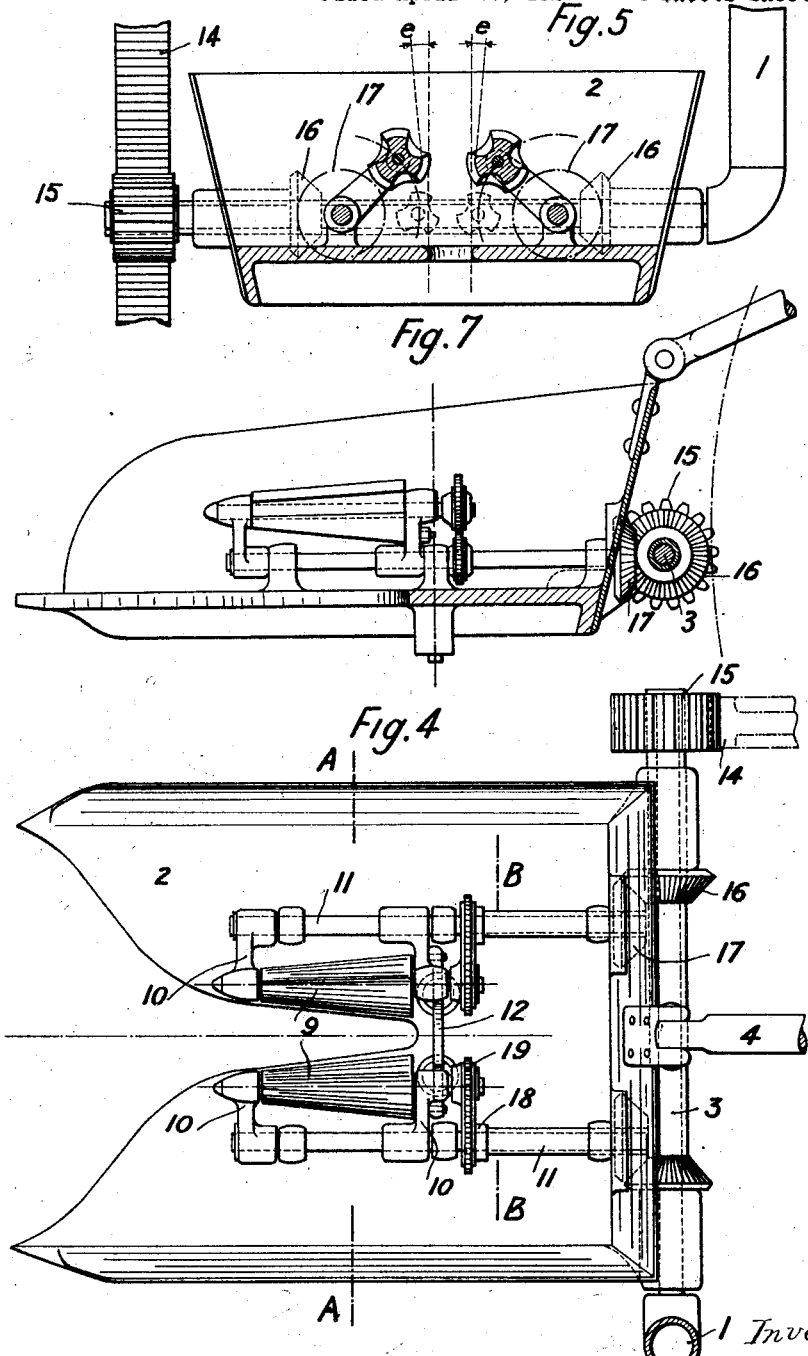

Patented Nov. 18, 1930

1,782,321

UNITED STATES PATENT OFFICE

EUGENE EDMOND CHARLES SERRE, OF PARIS, FRANCE

REAPING MACHINE

Application filed April 12, 1927, Serial No. 183,044, and in France May 1, 1926.

The present invention relates to an agricultural machine for the automatic reaping of maize cobs and according thereto comprises a wheel, designed for the purpose of tearing off the maize cobs, disposed along the axis of the machine and having imparted to it a rotary motion in the opposite sense to that of the running wheels of the said machine, and which wheel is provided with arms, at the extremities of which are mounted cups or buckets so shaped that each of them has at its base a V-shaped slot or notch. Above the edges of each slot or notch and slightly rearward in relation thereto, two preferably conical, riffled or grooved pieces are arranged, actuated by a rotary movement, directed from their point of proximity to the soil, and being able also to oscillate around axes, practically parallel to their own axis of rotation, in such a way as to be able to approach one another by reason of the reaction caused by the maize cobs at the time of their being torn off, and thus to facilitate the separation of the maize cobs from the stalk, without any undue pull on the latter.

Other features will be revealed by the perusal of the specification which follows, and by the annexed drawings, which show, merely as an example, one embodiment of the machine according to the invention.

In these drawings:

Fig. 2 is a plan-view,

Fig. 3 is a front view,

Fig. 4 is a plan, to a larger scale of a cup or bucket,

Fig. 5 is a section on the line A—A of Fig. 4,

Fig. 6 is a section on the line B—B of Fig. 4,

Fig. 7 is a section on the line C—C of Fig. 4 and

Figure 8:
Figure 9:
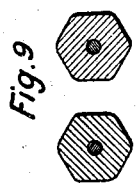
Figure 10:

Figs. 8, 9 and 10 refer to various shapes of the conical pieces arranged in the buckets and adapted to tear off the maize cobs.

According to this preferred form of carrying the invention into effect, the machine comprises a wheel or spider mounted on a shaft 6 and provided with a plurality of arms 1 at the ends of which cup or bucket shaped forks 2 are mounted, which are adapted to tear the maize cobs off the stalk.

These forks are articulated or jointed around axles 3 carried by the arms 1 and are connected by means of rods 4 to an eccentric 5 which is keyed upon the shaft 6 of the wheel in such a manner that the bucket forks 2 remain substantially parallel with the ground during their ascending movement.

Each connecting rod 4 is pivoted at one end to the eccentric 5 and at its other end to its corresponding fork 2 with one exception, viz. the rod denoted by $4^a$ which is fixed in a rigid manner to the eccentric.

During the motion of the machine in the sense indicated by the arrow $f$ this wheel 1 is rotated in the sense of arrow $f'$ due to its drive consisting of a sprocket wheel 7 keyed on the shaft 6, and linked by means of a chain to another sprocket wheel which is mounted loose on shaft 8 of the machine wheels rotating themselves in the direction indicated by arrow $f^2$, and which is engaged by a train of reversing gear wheels.

The cup or bucket shaped forks 2 are each constituted by a cup or bucket proper 2 the bottom of which having a slot or notch the width of which diminishes from the edge of the cup or bucket till it attains a width corresponding to the smallest diameter of a maize stalk.

Above the edges of this slot, on each side, and slightly rearward from the edges two conical, grooved parts 9 are arranged in the shape of a V. These parts 9 are adapted to rotate in opposite sense to one another. The horizontal clearances of the conical pieces 9 in relation to the edges of the slot have been denoted by $e$ in Fig. 5. These conical parts 9 are mounted on the extremities of two small cranks 10 and are free to oscillate around a shaft 11 their course is limited to approximately 45° above the plane of the bucket-bottom 2 by a part 12 connecting the two cranks 10 or sides of the slot. This part 12 is pressed upwardly by means of the two springs 13 (Fig. 6) in such a way that it has a tendency to keep the two conical parts 9 apart. The conical parts 9 receive their rotary movement, as shown in the drawing, by means of a gear wheel 14 which, driven in the sense of arrow $f^3$ by means of a train of gear wheels through shaft 8 meshes with a pinion wheel 15 keyed to the end of shaft 3, transmitting its motion to the said conical parts 9 through the intermediary of the bevel gear wheels 16 and 17 keyed respectively on the shaft 3 and each of the axles 11 and sprocket wheels 18 and 19 connected by a chain 20.

The conical parts 9 ensure the tearing off of the cobs of the maize by the bucket forks 2, by reason of their cross-section, which may be of the shape as shown in Figs. 5, 8, 9 and 10. The distance between the conical parts 9 vary during the rotation of the said parts 9 between a maximum and minimum value which variation is repeated approximately for each centimetre movement of the fork. Further, by reason of their backward clearance, the parts seize the maize cobs carried on the stalks which are enmeshed in the forks above which they protrude, and sever them without crushing them, and without spoiling the stalk of the plant. Moreover the articulation of these cones 9 around the axles 11 gives to these cones a greater flexibility of movement and obviates the reaction on the plant which the tearing off of the cobs might produce; at the same time ensuring a more efficient wedging action on these cobs, because this wedging action increases with an increase in the reactive effort produced by the cobs, due to the fact that the cones approach each other in descending, and as the part 12 limits the extent of their movement towards one another, the stalks of the plant cannot be damaged.

The shaft of the fork-wheel 1 which operates following the direction of the arrows, to tear the maize cobs off, is movable in a slide 21 which allows the adjustment thereof so that the wheel may be positioned at a convenient height, according to the average distance of the maize cobs from the ground, in such a manner that the forks 2 pass at their lowest position, at an ample distance from the soil to avoid the leaves and weeds.

The maize cobs, torn off and then gathered by the fork-buckets, are emptied by the tipping motion of the buckets at a certain point of their course into one of the bucket members or cob catchers 22 of special shape mounted at the extremity of arms of the wheel 23.

These buckets 22 are of equal number to the number of buckets 2, and the wheel 23 upon which they are mounted, is revolving at the same speed as the wheel 1; it being rotated by the wheels of the machine, when same is moving, by means of sprocket wheels 24, 25, 26 and 27.

This arrangement allows the buckets 22 to be in a position in front of the buckets 2 at the precise moment when these buckets tip by means of the rods 4 connected to the eccentric 5.

The shape of buckets 22 is such, that they, after having revolved through a certain angle allow the maize cobs to escape or fall into the hopper of a machine 28 for stripping them of leaves or the like.

The cobs stripped of their leaves are conveyed through a trough 35 to an elevator 36 which empties them into a truck, moved along the side of the machine.

So as to allow the buckets 22 to remain in the same relative position to the buckets 2 of wheel 1 the shaft of wheel 23 can also slide in a gliding guide 29.

Figure 1:
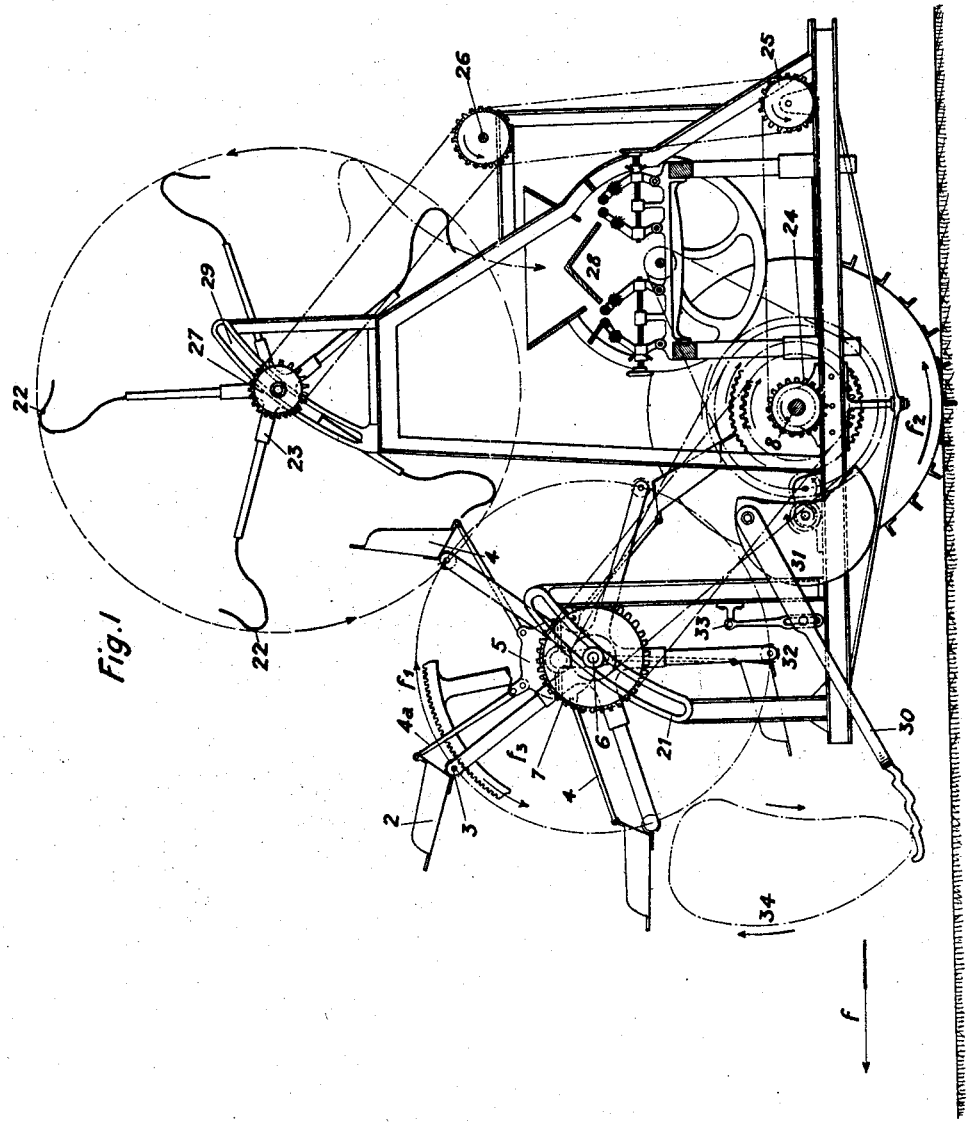
Fig. 1 is an elevation and partial section of my improved machine.

On each side of the fork wheel 1 two arms 30 are disposed, and are driven by two flywheels with a crank 31 each having a gudgeon pin, engaged in a slot made in a small crank 32 which can oscillate around pin 33. The extremities of these arms 30 each describe a curve 34, shown in dotted lines in Fig. 1 with a quick return motion.

These arms, by their motion, straighten and bring the axis of the forks, the stalks of plants which are lying down or too much inclined towards the ground within range of the fork buckets 2.

The two flywheels 31 are actuated by the rotation of the machine-wheels, on the axle of which wheels a pinion wheel is keyed, meshing with another pinion wheel is mounted on the shaft of the above mentioned flywheels.

Naturally the present invention is not limited to the embodiment shown and described, which has only been chosen as an example and it is possible to modify it in detail without thereby going outside the substance of this invention.

I claim:—

1. An agricultural machine for the automatic reaping of maize cobs from the stalks comprising a frame adapted to move over the ground, a spider member having a plurality of arms rotatably mounted on said frame, means for causing rotation of said spider member, bucket members carried by each of said arms and oscillatable means rotatably mounted in said bucket members for resiliently and positively gripping the said cobs and detaching the same from their stalks, means for rotating and for causing oscillation of said oscillatable member, and means for normally holding said oscillatable means at a pre-determined distance above the bucket members and for limiting the angle of movement toward the bucket.

2. An agricultural machine for the automatic reaping of maize cobs comprising a frame, running wheels for said frame, a spider member rotatably mounted on said frame, means for rotating the wheel member in the opposite direction to that of the running wheels, radial arms on said wheel member, bucket members mounted at the extremities of said arms, a V-shaped notch in the bottom of each bucket member to engage the stalks of the maize and oscillatable maize cob gripping members resiliently and rotatably mounted in juxtaposition to said notches in the bucket members adapted to grip the cobs and detach the same from their stalks, means for rotating and for causing oscillation of said oscillatable means, and means for normally holding said oscillatable means at a pre-determined distance above the bucket members and for limiting the angle of movement toward the bucket.

3. An agricultural machine for the automatic reaping of maize cobs from their stalks comprising a frame adapted to move over the ground, a spider member having a plurality of arms rotatably mounted on said frame, means for causing rotation of said spider member, bucket members carried by each of said arms, means operatively associated with said spider member for maintaining the bucket members substantially parallel to the ground during their ascending movement whereby the reaping of the maize cobs from the stalks is facilitated even though the cobs are located at various heights on the stalks, oscillatable means rotatably mounted in said bucket members for resiliently and positively gripping the said cobs and detaching the same from their stalks, means for rotating and for causing oscillation of the said oscillatable means, and means for normally holding said oscillatable means at a pre-determined distance above the bucket members and for limiting the angle of movement toward the bucket members.

4. An agricultural machine for the automatic reaping of maize cobs comprising a frame, running wheel for said frame, a spider member rotatably mounted on said frame, means for rotating the spider member in the opposite direction to that of the running wheel, radial arms on said spider member, bucket members mounted at the extremities of said arms, a V-shaped notch in the bottom of each bucket member to engage the stalks of the maize, oscillatable maize cob gripping members resiliently and rotatably mounted in juxtaposition to said notches in the bucket members and having conical surfaces which positively grip the cobs and detach the same from their stalks, means for rotating and for causing oscillation of said oscillatable members, and means for normally holding said oscillatable members at a pre-determined distance above the said bucket members and for limiting the angle of movement toward the bucket members.

5. An agricultural machine for automatic reaping of maize cobs comprising a frame, running wheels for said frame, a spider member rotatably mounted on said frame, means for rotating the spider member in the opposite direction to that of the running wheels, radial arms on said spider member, bucket members mounted at the extremities of said arms, a V-shaped notch in the bottom of each bucket member to engage the stalks of maize, conical oscillatable maize cob gripping members resiliently and rotatably mounted in juxtaposition to said notches in the members and having conical surfaces which positively grip the cobs and detach the same from their stalks, means for rotating and for causing oscillation of said oscillatable members carrying the maize cob gripping members, the said conical, oscillatable, maize-cob gripping members having cross sections of such shapes that the distance between adjacent parts on their surfaces vary during rotation of the said members from a maximum at the initial gripping cob gripping position to a minimum at the final cob gripping position, and means for normally holding said oscillatable member at a pre-determined distance above the bucket members and for limiting the angle of movement toward the bucket members.

6. An agricultural machine for the automatic reaping of maize cobs from their stalks comprising a frame adapted to move over the ground, a spider member having a plurality of arms rotatably mounted on said frame, means for causing rotation of said spider member, bucket members carried by each of said arms, oscillatable means rotatably mounted in said bucket members for resiliently and positively gripping the said cobs and detaching the same from their stalks, means for rotating and for causing oscillation of the said oscillatable members, and means for normally holding said oscillatable means at a pre-determined distance above the bucket members and for limiting the angle of movement toward the bucket members, oscillatable arms secured to the frame, and means for reciprocating said oscillatable arms from a point near the ground to a region adjacent to the path of the rotating spider member to bring the stalks within the range of the bucket members.

7. An agricultural machine for the automatic reaping of maize cobs from their stalks comprising a frame adapted to move over the ground, a spider member having a plurality of arms and rotatably mounted on said frame, means for causing rotation of said spider member, bucket members carried by each of said arms, oscillatable means rotatably mounted in the bucket members for resiliently and positively gripping the said cobs and detaching the same from their stalks, means for rotating and for causing oscillation of the said oscillatable members, means for normally holding said oscillatable members at pre-determined distance above the bucket members and for limiting the angle of movement toward the bucket members, a cob collecting member rotatably mounted on said frame and rotated in unison with the said spider member, and a plurality of circularly spaced cob catchers carried on said cob collecting member and adapted to meet the bucket members and catch the cobs falling therefrom during the descending movement of the said bucket members.

In testimony whereof I have signed my name at Paris, France, this 30th day of March, 1927.

EUGENE EDMOND CHARLES SERRE.